United States Patent [19]

Wolter

[11] 3,748,877
[45] July 31, 1973

[54] STEERING LOCK, IN PARTICULAR FOR AUTOMOTIVE VEHICLES
[75] Inventor: Heinz Wolter, Cologne-Lindenthal, Germany
[73] Assignee: Firma Josef Voss KG, Cologne, Germany
[22] Filed: June 9, 1971
[21] Appl. No.: 151,262

[30] Foreign Application Priority Data
June 10, 1970 Germany.................. P 20 28 475.7

[52] U.S. Cl.......................... 70/186, 70/252, 70/455
[51] Int. Cl. ............................................. B60r 25/02
[58] Field of Search............................... 70/186, 252

[56] References Cited
UNITED STATES PATENTS
3,566,635  3/1971  Wolter................................. 70/252
3,650,131  3/1972  Eichenauer........................... 70/252

Primary Examiner—Albert G. Craig, Jr.
Attorney—Ernest G. Montague

[57] ABSTRACT

A steering lock equipped with a locking cylinder, in particular for automotive vehicles which comprises a steering spindle and a bolt forced by a spring force into its locking position and blocking the steering spindle against rotation. A lever-like locking member secures the bolt against undesired blocking of the steering by resiliently engaging with its end in open position of the bolt and rigidly mounted in a lock housing. The locking member is releasible by means of a key operating the tumblers, such that the release takes place only after almost completed removal of the key. The bolt has a bolt tail including a latch. An immovable pin supports rotatably the locking member, and the latter enters in its locking position behind said catch-like yieldingly mounted latch of the bolt tail.

5 Claims, 10 Drawing Figures

PATENTED JUL 31 1973 3,748,877

INVENTOR.
Henry Valter
BY
ATTORNEY

PATENTED JUL 31 1973          3,748,877

INVENTOR.
Henry Holter
BY
ATTORNEY

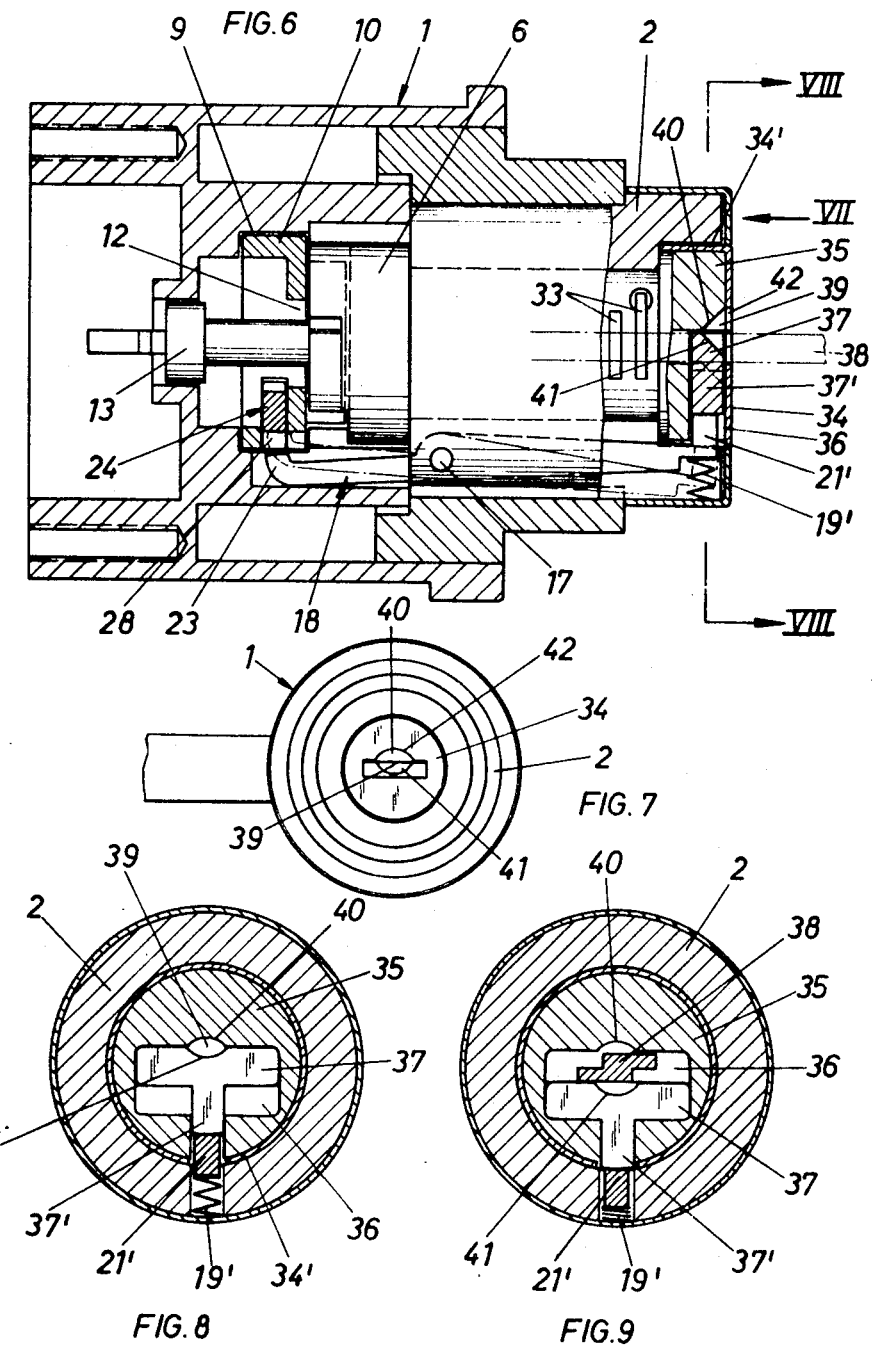

STEERING LOCK, IN PARTICULAR FOR AUTOMOTIVE VEHICLES

The present invention relates to a steering lock, in particular for automotive vehicles, in general, and to such steering lock having a lock cylinder, in which the steering shaft is blocked against rotation by means of a bolt entering by a spring force into the locking position and in which the bolt is secured against non-intended blocking of the steering by a rigid, lever-like locking member resiliently catching with its end in open position of the bolt. The locking member is thereby lifted by means of a key operating the tumblers, such that the lifting takes place only after complete or nearly complete removal of the key.

In such an embodiment, the bearing pin of this rigid, double-armed locking member, which is spring-biased, is guided in a groove of the lock body. The forward end of the locking member supports itself in the holding position, while the key is inserted, on the back of the key and in the locking positions on the jacket face of the cylinder core, while the resting tooth, sitting at the other end of the locking member, enters in withdrawn position of the locking member in a stop opening of the latter. The locking tooth remains in this stop opening, when the steering lock is brought into the "hold position" and the key is not withdrawn. The bolt which is not secured by the eccentric in the "hold position," rather being held merely by the locking member, can as it has been found, jump forward in case of jolt-vibrations, if the locking member rests in spite of the inserted key.

It is one object of the present invention, to provide a steering lock, in particular for automotive vehicles, wherein the steering lock in the "hold position," of the steering lock in the case of a withdrawn bolt and inserted key does not release the bolt even in the case of the roughest jolt-vibrations.

It is another object of the present invention, to provide a steering lock, wherein the lock member, which is rotatable about an immovable pin, enters in its locking position behind e.g., a catch-bolt, yielding by a mounted latch of the bolt-tail.

In accordance with the present invention it is of advantage, that the latch is mounted in one arm of the frame-like bolt-tail and is charged by the bolt-spring.

An advantageous embodiment resides in accordance with the present invention, in the fact, that behind the head plate of the cylinder core extends a key-slot-closing slide which is disposed radially to the cylinder core and mounted yieldingly in a direction parallel to the swinging movement of the latch, which closing slide engages the forward end of the locking member.

It is favorable thereby, if a funnel-like key-insert-opening is provided, which is formed, on the one hand, by an end-sided inclination of the cylinder core and, on the other hand, by an inclined face of the key-slot-closing side.

Finally, it is still advantageous, in accordance with the present invention, that the locking member spring is disposed axially flush to the ridge of the T-like formed key-slot-closing-slide.

This solution obtains a steering lock, the withdrawn bolt of which remains reliably in its position in the "hold position" of the steering lock in case the key is inserted. Even the roughest jolt-disturbances cannot free the bolt. Accidents, which caused a forward jump of the bolt into the blocking position, were thereby effectively prevented. The bolt can jump forward then only, if the key is withdrawn nearly completely. For this purpose the locking member is mounted about an immovable pin of the lock body, while merely a latch on the bolt-tail is to be coordinated to the locking tooth. The latter has an obliquely rising control face, so that the latch can yield catch-like for the disturbance-free operation of the lock. Upon complete withdrawal of the bolt, the latch then enters in front of the locking tooth of the locking member. In steering locks of this type, there can also be equipped bolts which are displaceable crosswise to the housing, as well as bolts which are guided in the axial direction of the housing. The fact, that the latch is mounted in the one arm of the frame-like formed bolt-tail, which is displaceable crosswise to the housing, brings about the advantage of a favorable design of the steering lock. In this manner also the known design of the steering-spindle lock housing can be preserved without any changes. Since the spring engaging the bolt also engages the locking latch, no additional spring is to be provided. The steering lock according to the present invention can therefore be produced at a favorable price. If a control of the locking member is to take place from the wide side of the key, merely and additionally a transfer means is provided behind the head plate of the cylinder core, which transfer means engages the forward end of the locking member. A transfer means designed as a key-slot-closing-slide performs a double-function: Firstly, it serves for the control of the locking member, and, secondly, it prevents the penetration of dust, e.g., into the inside of the lock. This version is suitable in particular for steering locks with plate tumblers. It is possible, however, to equip a lock with pin tumblers with this key-slot-closing-slide. The funnel-like key-insert-opening, formed by an end-sided inclination of the cylinder core and of the key-slot-closing-slide, permits a simplified insertion of the key, as well as a disturbance-free yielding of the slide. Upon removal of the key from the steering lock, the locking bolt spring, which is flush axially to the ridge, engages indirectly the T-like formed key-slot-closing-slide, so that thereby likewise an additional spring biasing the slide can be omitted.

With these and other objects in view, which will become apparent in the following detailed description, the present invention, which is shown by example only, will be clearly understood in connection with the accompanying drawings in which:

FIG. 6 is a longitudinal section of the steering lock with plate tumblers;

FIG. 7 is an end view to the showing in FIG. 6 seen in the direction of arrow VII of FIG. 6;

FIG. 8 is a section along the lines VIII—VIII of FIG. 6;

FIG. 9 is a section similar to that of FIG. 8, however, with inserted key; and

Figure 1:
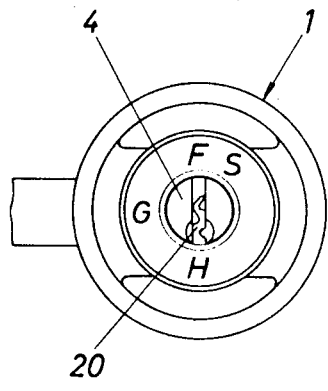
FIG. 1 is a front elevation of the steering lock with pin tumblers.
Figure 2:
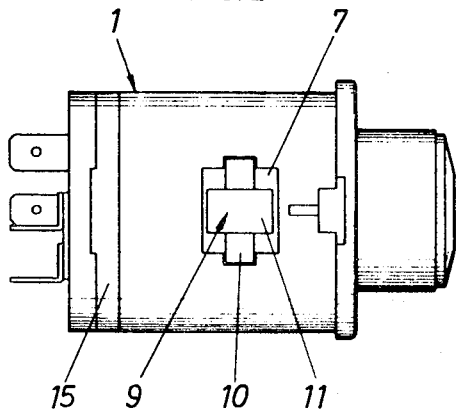
FIG. 2 is a side elevation of the steering lock.
Figure 3:
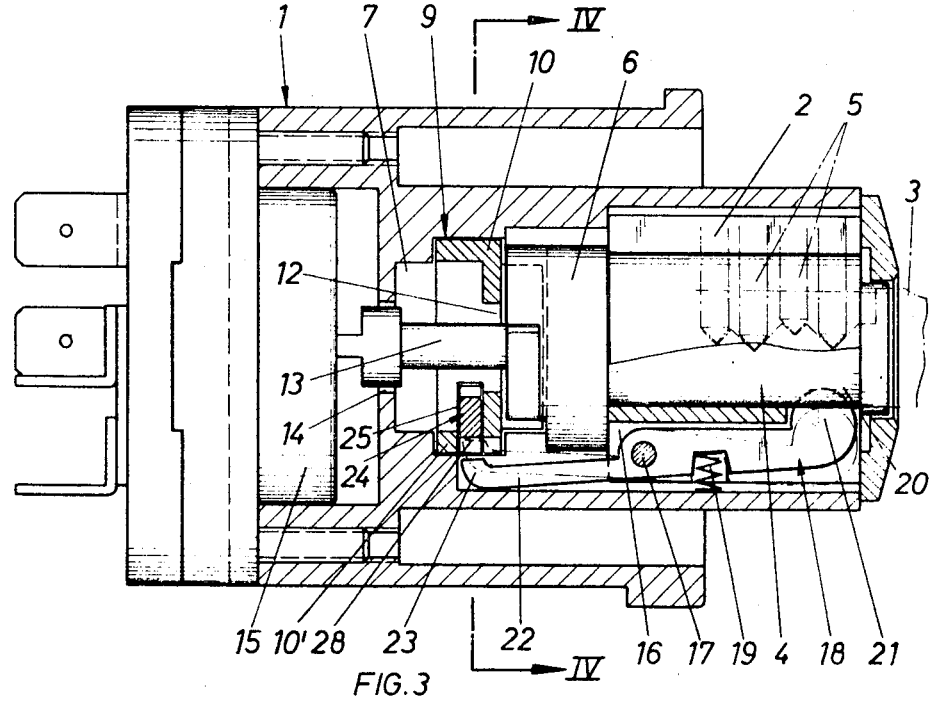
FIG. 3 is a longitudinal section, at enlarged scale, of the steering lock in its "hold position" with the key being withdrawn.
Figure 4:
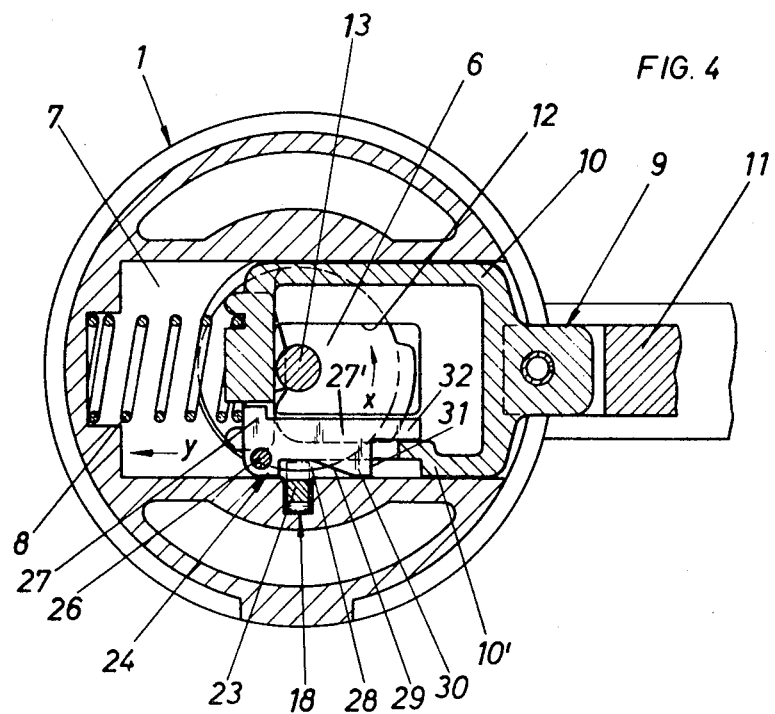
FIG. 4 is a section along the lines IV—IV of FIG. 3.

Referring now to the drawings, and in particular to FIGS. 1-5, which disclose a first embodiment of the present invention, in which the steering lock is equipped with pin tumblers.

In a lock housing 1 of the steering lock is disposed a cylinder lock housing 2. The latter supports a cylinder core 4 turnable by means of a key 3 into the positions "hold-garage-travel-start," to which cylinder core 4 are coordinated pin tumblers 5.

The cylinder core 4 is connected at its rear end with an eccentric 6, which controls a bolt 9 which is displaceable in a cross channel 7 of the lock housing 1 of the steering spindle and which is charged by a bolt spring 8. The bolt 9 consists of a frame-like formed bolt tail 10 and bolt head 11 pivotally connected with the bolt tail 10, which bolt head 11 enters a recess of the steering column in its blocking position.

A passage opening 12 for a shaft 13, which is secured to the eccentric 6, is provided in the bolt tail 10. The shaft 13 projects through a bore 14 of the housing 1 of the steering spindle and enters an ignition-starting switch 15, the switching roller of which (not shown) is rotated in accordance with the positions of the cylinder core 4.

A double-armed locking member 18, which extends over the entire length of the cylinder lock body 2, is mounted in a longitudinal groove 16 of the cylinder lock housing 2 about an immovable pin 17. The locking member 18 is biased by a spring 19 such, that it extends with the withdrawn key 3 in the "hold" position of steering lock with its forward end 21 in the key slot 20 of the cylinder core 4. The opposite end 22 has a stop tooth 23, which cooperates with a latch 24 of the bolt tail 10.

The angularly shaped latch 24 is disposed in a recess 25 of the arm 10' of the frame-like bolt tail 10 and is swingably mounted about the pin 26. The shorter arm 27 is engaged by the bolt spring 8, while the other, the longer arm 27' forms a recess 28, which receives a catch nose 30 by means of an obliquely rising control face 29. The catch nose 30 forms a set-off section 32 by means of a step 31, which section 32 engages on the inside, the arm 10' and thus forms the abutment for the swinging movement of the latch 24.

Figure 5:
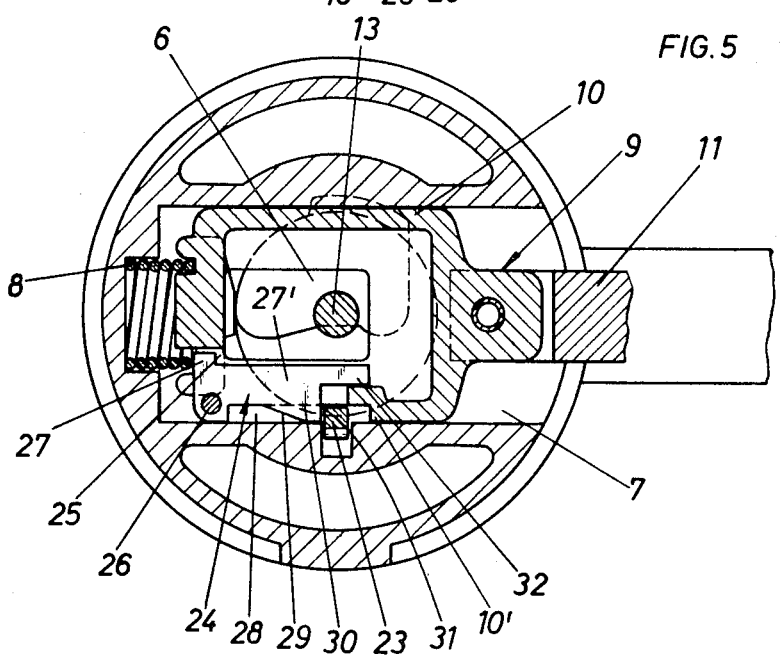
FIG. 5 is the same section as shown in FIG. 4, yet in "garage position" of the lock.

The operation of the steering lock is as follows:

Upon insertion of the key 3, the locking member 18 swings forcibly about the pin 17 by the key back back of the key. The forward end 21 moves out of the key slot 20, while the rear end 22 of the locking member 18 enters with its stop tooth 23 into the recess 28 of the latch 24, shown in point-dotted lines in FIGS. 3 and 4. The cylinder core 4 can be brought now with its eccentric into the corresponding rotary position. The eccentric turning in the direction of the arrow X (FIG. 4) causes a longitudinal displacement of the bolt 9 in the direction of the arrow Y (FIG. 4), whereby the stop tooth 23 swings over the control face 29 the latch 24. Upon return of the bolt 9, the stop tooth 23 steps in front of the step 31 of the locking latch, which swings into its base position (FIG. 5). Also if the cylinder core 4 in addition to the eccentric 6 are again rotated into the "stop" position, the stop tooth 23 of the locking member 18 remains in its position, blocking the bolt. Even the roughest jolt-disturbances cannot bring about any position variation. Only upon almost complete withdrawal of the key 3, is it made possible for the locking member 18 to enter with its forward end 21 into the key slot 20, whereupon the stop tooth 23 frees the latch 24 and thereby the bolt.

The second embodiment of the invention is shown in connection with a steering lock with plate tumblers 33.

Behind a head plate 34 which grips with its pot edge 34' the end of the cylinder core 35, there is mounted in a recess 36 of the cylinder core 35, a yielding key-slot-closing-slide 37, disposed radially to the cylinder core and in a direction parallel to the swinging movement of the latch 24. The closing slide 37 has a T-shape and engages with its ridge 37' the forward end 21' of the locking member 18. The locking member spring 19' is flush axially with the ridge 37' of the slide 37.

In order to obtain a simplified insertion of the key 38 into the key channel, a funnel-shaped key-insert-opening 39 is provided which, on the one hand, is formed by the end-sided inclination 40 of the cylinder core 35 and, on the other hand, by an inclined face 41 of the key-slot-closure-slide 37. The head plate 34 has an indentation 42 following its contour exactly to an end-sided inclination 40.

The operation corresponds substantially to that of the first mentioned embodiment with the difference that the control of the locking member takes place over the wide side of the key.

Figure 10:
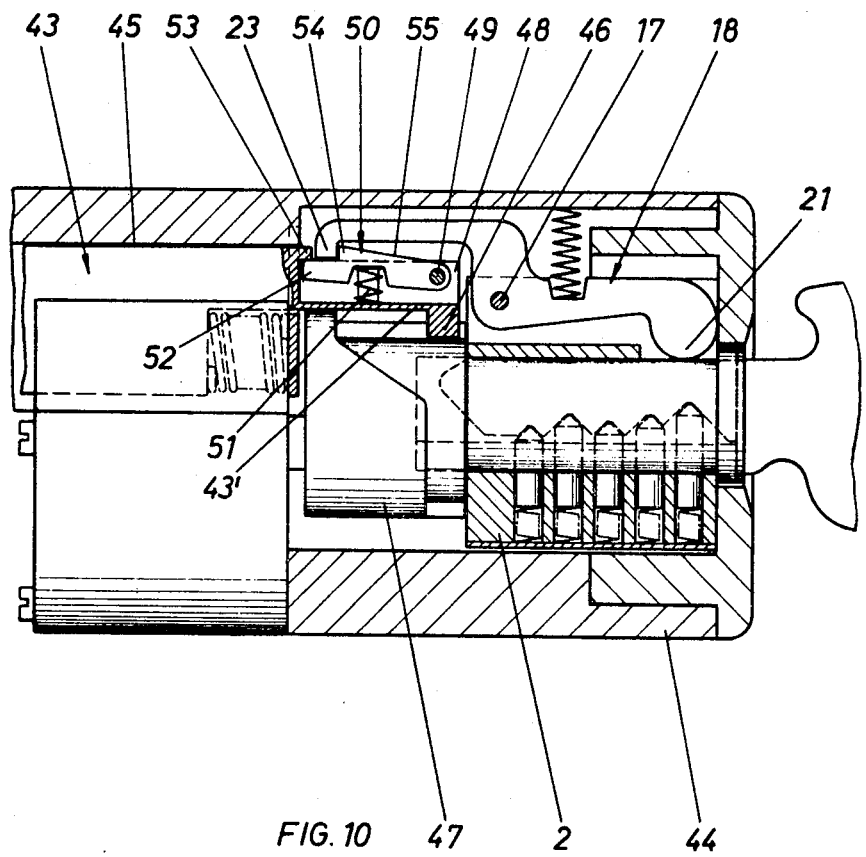
FIG. 10 is a longitudinal section of the lock, disclosing a third embodiment of the present invention.

In the embodiment disclosed in FIG. 10, the bolt 43 is guided in the cartridge-like lock housing 44 of the steering spindle displaceably in a groove 45 of the latter. The hook-shaped end 46 of the bolt tail 43' enters into a control cam 47 which is connected with the cylinder core.

In a longitudinal slot 48, a latch 50 charged by a spring 51 is mounted about the axial bolt 49, the free end 52 of the latch 50 engaging a projection 53 of the bolt 43. The latch 50 swings in the same plane as the locking member 18. The latter enters in the case of a withdrawn position of the bolt 43 with its stop tooth 23 in front of a catch nose 54 of the latch 50 and prevents a forward jumping of the bolt 43. If the control cam is moved from one operative position into the position "hold" and the key is not withdrawn, the position indicated in FIG. 10 is obtained. Only if the key is almost completely withdrawn can the forward end 21 of the locking member 18 enter into the key slot whereby the stop tooth 23 frees the latch 50 and thereby the bolt 43 for a forward jump.

Furthermore, the latch 50 has an obliquely rising control face 55 which permits the disturbance-free withdrawal of the bolt 43, whereby the stop tooth 23 swings the latch 50 out forcibly.

While I have disclosed several embodiments of the present invention, it is to be understood that these embodiments are given as examples only and not in a limiting sense.

I claim:

1. A steering lock equipped with a cylinder lock, in particular for automotive vehicles, comprising
    a steering spindle,
    a bolt biased into its locking position and blocking said steering spindle against rotation,
    a. lock housing having tumbler pins operatively mounted therein and a key slot,
    a lever-like locking member operatively securing said bolt against blocking of the steering by resiliently engaging with an end in an unlocking position of said bolt and mounted in said lock housing, said locking member being releasible by means of a key, the latter operating said tumbler pins, such that the release takes place only after almost completed removal of said key, said bolt having a bolt tail including a resiliently mounted latch having a catch means, an immovable pin pivotally supporting said locking member, and said locking member enters in a locking position behind said catch means of said latch of said bolt tail.

2. The steering lock, as set forth in claim 1, wherein said bolt tail is of frame shape and includes an arm, a bolt spring, said latch is mounted in said arm, and is biased by said bolt spring.

3. The steering lock, as set forth in claim 1, which includes a cylinder core having a head plate, key-slot-closing-slide extending radially to said cylinder core and yieldingly mounted behind said head plate of said cylinder core in a direction parallel to the pivotal movement of said latch, and said closing slide engages in the forward end of said locking member.

4. The steering lock, as set forth in claim 3, which includes a funnel-like key insert opening formed by an end inclination of said cylinder core and by an oblique face of said key-slot-closing-slide.

5. The steering lock, as set forth in claim 4, wherein a locking member spring is disposed axially flush to a ridge of said key-slot-closing-slide, the latter being of T-shape.

* * * * *